Figure 1:
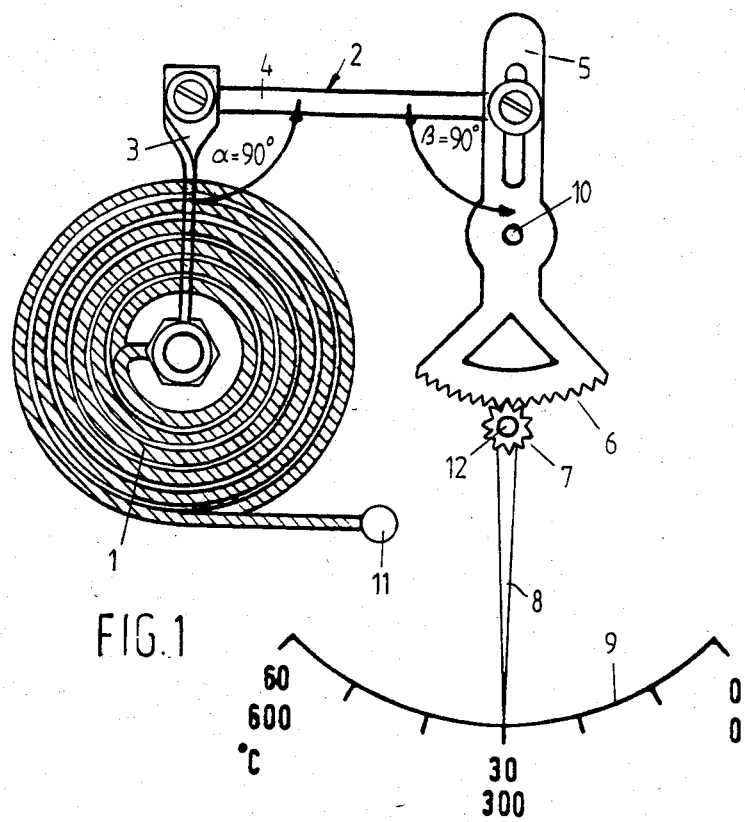

United States Patent [19]

Stiller

[11] Patent Number: 4,606,104

[45] Date of Patent: Aug. 19, 1986

[54] METHOD OF MAKING A GAS PRESSURE THERMOMETER

[75] Inventor: Johannes G. Stiller, Roden, Netherlands

[73] Assignee: Stiko Holding B.V., Roden, Netherlands

[21] Appl. No.: 659,624

[22] Filed: Oct. 11, 1984

[30] Foreign Application Priority Data

Oct. 12, 1983 [NL] Netherlands ............ 8303509

[51] Int. Cl.[4] .......... B21D 53/00; B23Q 17/00; G01K 5/00
[52] U.S. Cl. .................... 29/157 R; 29/407; 374/198; 374/203
[58] Field of Search ............ 29/157 R, 407; 374/198, 374/203, 208, 209

[56] References Cited

U.S. PATENT DOCUMENTS

| 2,477,242 | 7/1949 | Fahy ........................ | 29/157 R |
| 2,478,031 | 8/1949 | Visser ...................... | 29/157 R |
| 3,107,533 | 10/1963 | Le Van et al. .............. | 374/198 |
| 3,934,479 | 1/1976 | Posnansky ................. | 374/203 X |
| 4,148,123 | 4/1979 | Neubeck et al. ............ | 29/407 |

Primary Examiner—Howard N. Goldberg
Assistant Examiner—R. S. Wallace
Attorney, Agent, or Firm—Gottlieb, Rackman & Reisman

[57] ABSTRACT

In making a gas pressure thermometer measuring system comprising a container for the gas, a Bourdon tube, and a capillary of no more than about 20 m which connects said container to one end of the Bourdon tube is filled with the gas to a superatmospheric pressure prevailing at the ambient temperature. The system is hermetically sealed and the free end of the Bourdon tube is connected to a temperature indicator or recorder through a transmission mechanism. According to the method of the invention, a Bourdon tube is used which has a long overall spring movement of at least 22 mm and an effective spring movement of about 11 mm, the measuring system is filled with the gas to a pressure, prevailing at ambient temperature, of at least about 5 bar, and the non-linear indication occurring as the Bourdon tube is uncoiled is compensated for by adjusting angles $\alpha$ and $\beta$. Preferably, with the effective spring excursion of the Bourdon tube of about 11 mm a spring excursion of about 40–22 mm is selected, and the transmission mechanism preferably has a factor of magnification of no more than about 1:8.5.

3 Claims, 3 Drawing Figures

METHOD OF MAKING A GAS PRESSURE THERMOMETER

This invention relates to a method of making a gas pressure thermometer, in which a measuring system comprising a container for the gas, a Bourdon tube, and a capillary of no more than about 20 m which connects said container to one end of the Bourdon tube is filled with the gas to a superatmospheric pressure prevailing at the ambient temperature; the system is hermetically sealed; the free end of the Bourdon tube is connected to a temperature indicator or recorder through a transmission mechanism constituted by a multi-membered linkage including a lever bar, a draw link, and a rack bar with a pinion, with adjustable angles $\alpha$ between the central draw link and said lever bar, and $\beta$ between said draw link and said rack bar, the free end of the Bourdon tube being connected to the free end of said lever bar, and the toothed free end of the rack bar being connected to the temperature indicator or recorder through the end thereof, which contains said pinion, and the combination of the Bourdon tube, the transmission mechanism and the temperature indicator or recorder is housed in a cabinet which when a temperature indicator is used is further provided with a graduated dial.

It is well known that, in making a gas pressure thermometer, one will aim at obtaining a result in which the indication by the thermometer of the temperature values measured varies in linear proportion to the temperature variations. To achieve such a result, as described in De Ingenieur 46 (1954), pp. 083–090, it is primarily ensured that the gas with which the gas pressure thermometer is filled is in a state such that changes of said state resulting from temperature changes satisfy the gas law for an ideal gas.

This gas law, applied to a given weight of gas whose volume is kept constant can be expressed by the formula $$\frac{P1}{P2} = \frac{T1}{T2}$$

which shows that there is a linear relationship between absolute temperature and absolute pressure, so that the gas pressure thermometer can be provided with a linear graduation.

In practice, however, the starting condition, on which the correctness of the use of the gas law for an ideal gas is partly based, namely, that the volume of the gas enclosed in the gas pressure thermometer remains constant, will not be satisfied: when the gas pressure increases, the volume of the uncoiling Bourdon tube will be increased. Now, by selecting a low ratio between the volume of the Bourdon tube and the volume of the container of the gas, the effect of the increase in volume of the Bourdon tube on the total volume is automatically decreased, and is negligible when this ratio is, for example, 1:100.

Another aspect inherent in the use of a gas pressure thermometer and which adversely affects the above linear relationship between pressure and temperature is connected with the fact that the temperature of the gas present outside the container or probe, i.e. the gas enclosed in the capillary and the Bourdon tube, has a different temperature from the gas in the container. The deviation from the linear relationship between pressure and temperature caused by this can also be reduced to a tolerable range by increasing the difference in volume and hence the volume ratio between the Bourdon tube and the container of the gas.

In summary it can be concluded, therefore, that the measures which the art has taken to reduce the deviation from the linear relationship between pressure and temperature in the classical gas pressure thermometer and the causes of which were supposed to reside in the design of the gas pressure thermometer, have always been in the direction of increasing the volume of the gas container relative to that of the capillary and the Bourdon tube. In practice, this has led to the classical gas pressure thermometer being provided with a container 50 to 100 cm$^3$ in volume. A major practical drawback of the classical gas pressure thermometer having such a large container or probe is that its use requires a large space and that in addition it has a long response period. As the volume of the container of a thermometer well suited to industrial use is about 4–5 cm$^3$, a container volume of 50–100 cm$^3$ means in fact an impediment to its use in industry.

Netherlands Pat. No. 161,258 discloses a gas pressure thermometer in which the problem of the use of a gas container having a large volume of about 50 to 100 cm$^3$ is solved by providing the measuring system of the gas pressure thermometer with gas under a very high pressure, at ambient temperature, of 100 bar or more. It has been found that such a thermometer permits measuring temperatures with an accuracy of up to less than 1% of the total graduation with a container volume that can be as small as about 1 cm$^3$. On the other hand, it will be clear that the use of a high filling pressure, i.e., the pressure of the gas in the measuring system at ambient temperature, makes severe demands on the tightness of the measuring system. This requirement is all the more ponderant if the gas pressure thermometer is to be used in measuring ranges where the highest filling pressures must be used, i.e., in thermometers with small total measuring ranges, as, for example, measuring ranges of 0° to 60° C. and $-40°$ to $+40°$ C.

It is an object of the present invention to provide a method of the kind described to make a gas pressure thermometer in which, on the one hand, a low filling pressure of the gas of for example at least about 5 bar at ambient temperature is sufficient, and on the other hand, the measuring accuracy of 1% or better is retained, while the thermometer can yet be provided with a linear graduation and with a container having a volume well suited for use in industry of no more than, for example, 4 to 5 cm$^3$.

It has surprisingly been found that the above conditions, which may be deemed contradictory for a gas pressure thermometer, can be satisfied starting from a Bourdon tube having properties markedly different from those of current Bourdon tubes generally used in thermometers based on the expansion of gases and liquids and the tension of saturated vapours.

According to the invention, with reference to the preceding paragraph, the procedure is such that, for use in the measuring system, a Bourdon tube is chosen with a long overall spring movement of at least 22 mm and an effective spring movement of about 11 mm, the measuring system is filled with the gas to a pressure prevailing at ambient temperature, of at least about 5 bar, and the non-linear indication occurring as the Bourdon tube is uncoiled is compensated for by adjusting angles $\alpha$ and $\beta$.

In a further elaboration of the method according to the invention, a Bourdon tube is used with a spring movement of about 40-22 mm with the effective spring movement of about 11 mm.

The long spring movement of the Bourdon tube, to be observed in the method according to the invention, is achieved by making the tube of a tube material having a relatively small wall thickness and by giving the tube a larger width. Partly owing to the tube material being less flattened, the volume of the Bourdon tube to be used within the framework of the present invention is considerable and may be about twice that of classical gas pressure thermometers.

Effectively, with the effective spring movement of the Bourdon tube of about 11 mm, a total spring movement of about 40-22 mm is chosen.

Owing to the use, according to the invention, of a Bourdon tube having an effective spring movement of about 11 mm, a transmission mechanism with a smaller factor of magnification may be used than is the case with classical gas pressure thermometers.

It will be clear that this gives the additional advantage of promoting measuring accuracy, as in fact the intrinsic errors of a measuring system are increased by the transmission mechanism. In classical gas pressure thermometers the factor of magnification of the transmission mechanism is 1:16 to 1:18. In the method according to the present invention, preferably a transmission mechanism is selected whose factor of magnification is no more than about 1:8.5.

Owing to the larger volume of the Bourdon tube to be used according to the present invention, relative to the volume of the Bourdon tube normally used in the classical gas pressure thermometer, different amounts of gas will be used in the measuring systems in the two cases.

It is well known that, in view of the accuracy in measurement, the effect of the ambient temperature on the thermometer cabinet and the parts of the gas pressure thermometer housed therein, such as the Bourdon tube, the transmission mechanism and the pointer with dial, cannot be neglected. For that reason, as is well known, a gas pressure thermometer is provided with a temperature compensation system obtained by making the lever bar of a bimetal.

In prior gas pressure thermometers, this compensation may be substantially equal for all measuring ranges. In the gas pressure thermometer of the present invention, it has been found that a single compensation measure is not sufficient, but this measure has to be adapted to different measuring ranges, that is to say, the type of bimetal from which the lever bar is made is selected depending on the measuring range of the gas pressure thermometer, and accordingly on the filling pressure of the gas, i.e., the pressure of the gas at ambient temperature.

The use of the Bourdon tube according to the present invention has in practice has found to give rise to a greatly non-linear uncoiling of the Bourdon tube, which would render it impossible to use a linear graduation. This effect is enhanced still further by using, in accordance with this invention, a relatively small gas container. It has surprisingly been found that this effect of the Bourdon tube selected according to the invention, which by itself is a disadvantageous effect, can be eliminated, and a linear graduation can yet be used in the gas pressure thermometer, and the measuring accuracy of 1% of the total graduation or better, required for industrial use, can be achieved, by appropriate adjustment of angles $\alpha$ and/or $\beta$ between the draw link and the lever bar and between the draw link and the rack bar, respectively. Conventionally, these angles $\alpha$ and $\beta$ are 90° and 90°, but within the framework of the present invention they may have different values of up to, for example 135° and 50°, as will be described in more detail hereinafter.

The method according to the invention is productive of accurate gas pressure thermometers of good performance and having widely varying measuring ranges with a lowest temperature of, for example, −245° C. and a highest temperature as high as, for example, 800° C.

The good operation of the gas pressure thermometer according to the invention can be obtained irrespective of the nature of the gas, so that, for example, helium or argon may be used, but also, for example, nitrogen.

Figure 2:
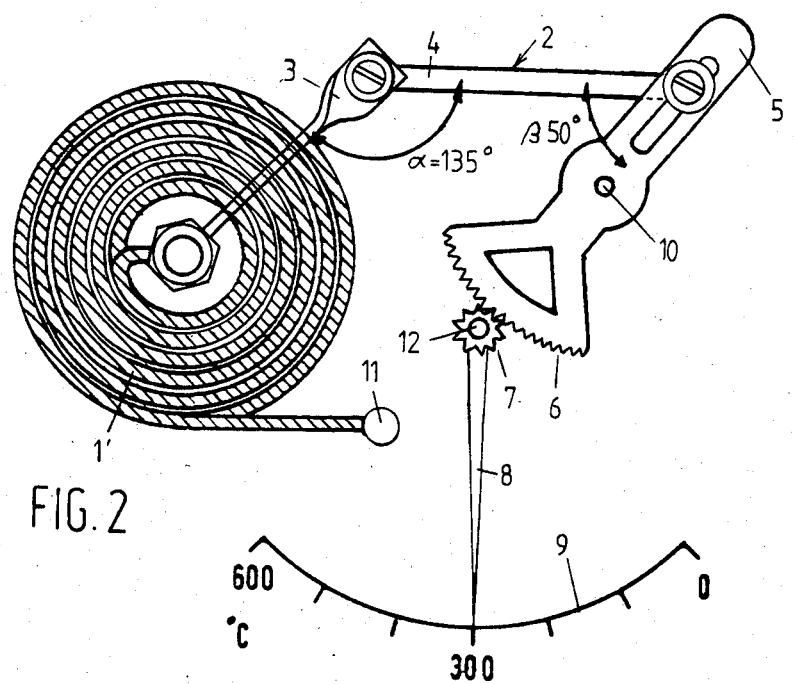
Figure 3:
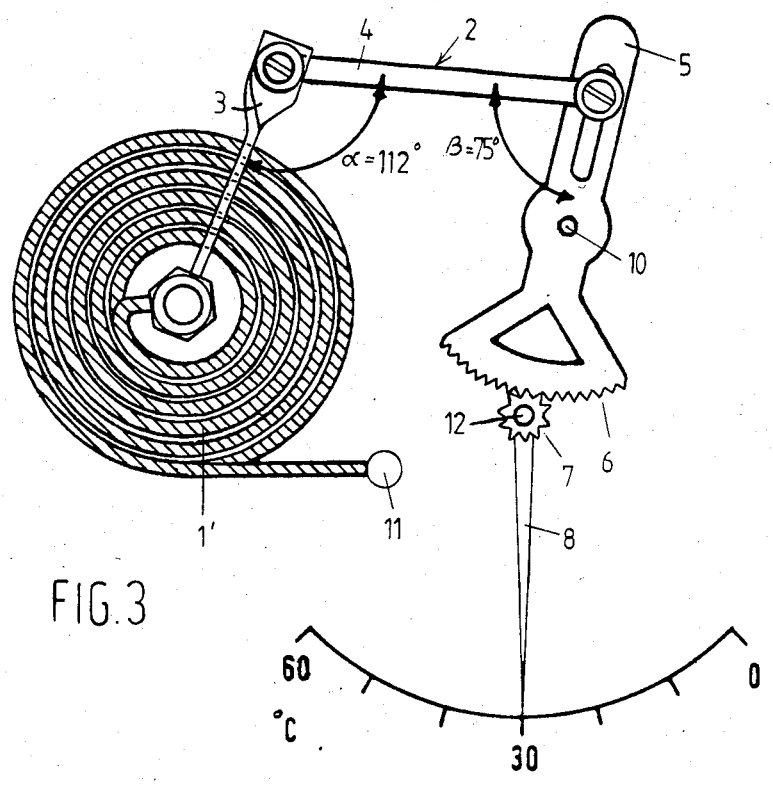

The invention will be described in more detail hereinafter with reference to the accompanying drawings. In said drawings, FIG. 1 diagrammatically shows the combination of a Bourdon tube connected to the transmission mechanism within a classical gas pressure thermometer with a measuring range of from 0° to 60° C. and of from 0° to 600° C., with the angles $\alpha$ and $\beta$, as conventional, being equal for both measuring ranges and amounting to 90°;

FIG. 2 shows a combination similar to FIG. 1, but for use in a gas pressure thermometer according to the present invention with a measuring range of from 0° to 600° C.; and FIG. 3 shows the combination of FIG. 2 used in a gas pressure thermometer according to the present invention with a measuring range of from 0° to 60° C.

In FIGS. 1-3, like reference numerals refer to corresponding parts.

The Bourdon tube 1 (FIG. 1) or 1' (FIG. 2 and FIG. 3) has in each case one end connected to a lever bar 3 forming part of a transmission mechanism 2, which further comprises a draw link 4 and a rack bar 5, with the draw link 4 having its end connected to, on the one hand, lever bar 3 and, on the other hand, rack bar 5 in a manner such that angles $\alpha$ and $\beta$ between draw link 4 and lever bar 3 and between draw link 4 and rack bar 5, respectively, are adjustable.

Rack bar 5 is mounted for rotation about shaft 10 and is provided with a rack 6 cooperating with a pinion 7 connected to pointer 8. The combination of pinion and pointer is mounted for rotation about shaft 12, and, upon rotation, the tip of the pointer is moved along a graduation 9 to a position corresponding to the temperature measured.

The end 11 of Bourdon tube 1 or 1' is connected, in a manner not shown, through a capillary tube to the container of the gas, as is conventional in gas pressure thermometers.

FIGS. 1-3 show the pointer in each case in a position pointing to the centre of the graduation.

The entire combination of Bourdon tube 1 and transmission mechanism 2 as shown in FIG. 1 relates to the use thereof in a classical gas pressure thermometer: the total spring movement of the Bourdon tube therein is 13 mm with a Bourdon tube volume of 0.14 cm$^3$; the volume of the container of the gas, not shown, is 100 cm$^3$. In the position of the pointer pointing to the centre of the graduation, angles $\alpha$ and $\beta$ are equal and 90°.

FIGS. 2 and 3 show similarly constructed combinations of Bourdon tube 1' and transmission mechanism 2 according to the present invention, each used in a gas pressure thermometer made in accordance with the present invention with different measuring ranges, i.e. of from 0° to 600° C. (FIG. 2) and of from 0° to 60° C. (FIG. 3). The total spring movement of the Bourdon tube for the measuring range of from 0° to 60° C. is 38.5 mm, and for the measuring range of from 0° to 600° C. is 22 mm with equal volumes of Bourdon tubes of 0.23 cm³.

In both cases the volume of the container of the gas, not shown, is 4.5 cm³.

The transmission mechanism 2 has, in both cases, a factor of magnification of 1:8.2. The lever 3 forming part of the transmission mechanism is made of a bimetal which, in this case, however, is different for the different measuring ranges.

In the combination shown in FIG. 3, used in a gas pressure thermometer with a measuring range of from 0° to 60° C., the pressure of the gas with which the measuring system is filled in 50 bar at a temperature of 20° C., and in the combination shown in FIG. 2, for use in a gas pressure thermometer with a measuring range of from 0° to 600° C., the pressure is 9 bar.

In order to accomplish a linear deflection of the pointer as a function of the temperatures measured, the angles between lever bar and draw link 4 and between draw link 4 and rack bar 5 are set as follows:

| gas pressure thermometer with measuring range | angle α between lever bar and draw link in degrees of arc | angle β between draw link and rack bar in degrees of arc |
| --- | --- | --- |
| 0°–60° C. | 112 | 75 |
| 0°–600° C. | 135 | 50 |

The gas pressure thermometers according to the present invention, provided with the combinations shown in FIGS. 2 and 3, were set and calibrated as follows:

The setting and calibration was effected as regards temperatures of up to 200° C. in thermostatic calibration baths of Instrumentenfabriek Tamson N.V., whose temperatures were automatically and accurately kept constant at ±0.01° C. These temperatures were constantly monitored with digital precision thermometers whose good operation was, in turn, regularly checked with Arno Amrel, OHG, high-precision bar thermometers, supplied with a calibration certificate. In the Tamson thermostatic calibration baths, the heating medium for temperatures of up to 100° was water, and for temperatures of from 100°–200° C. Tamson silicone oil 47 V 100.

The setting and calibration for temperatures in excess of 200° C. was effected in a Schwing Thermocal Eichund Prüfbad, Typ TH050, the temperatures of which were automatically and accurately kept constant ±0.15° C. These temperatures, too, were constantly monitored with a digital high-precision thermometer, whose good operation was in turn regularly checked with Arno Amrel OHG high-precision bar thermometers supplied with a calibration certificate. In the Schwing calibration bath, the temperature transmission fluid used was fluidized aluminium oxide having a particle size corresponding to 180 mesh.

The calibration results of the gas pressure thermometers are summarized in the following table:

| Calibration results in °C. | |
| --- | --- |
| Calibration temperature | Indication |
| Gas pressure thermometer with measuring range 0°–60° C. | |
| 0 | 0 |
| 20 | 19.9 |
| 40 | 39.8 |
| 60 | 60 |
| Gas pressure thermometer with measuring range 0°–600° C. | |
| 0 | 0 |
| 100 | 99.5 |
| 200 | 199.3 |
| 300 | 300.0 |
| 400 | 397.5 |
| 500 | 498.8 |
| 600 | 599.0 |

The calibration results show that for each of the measuring ranges, the gas pressure thermometers made in accordance with the present invention permit making temperature measurements with a deviation of even less than 1% of the graduation.

I claim:

1. In a method of making a gas pressure thermometer, in which a measuring system comprising a container for the gas, a Bourdon tube, and a capillary of no more than about 20 m which connects said container to one end of the Bourdon tube is filled with the gas to a superatmospheric pressure prevailing at the ambient temperature; the system is hermetically sealed; the free end of the Bourdon tube is connected to a temperature indicator or recorder through a transmission mechanism constituted by a multi-membered linkage including a lever bar, a draw link, and a rack bar with a pinion, with adjustable angles α between the central draw link and said lever bar, and β between said draw link and said rack bar, the free end of the Bourdon tube being connected to the free end of said lever bar, and the toothed free end of the rack bar being connected to the temperature indicator or recorder through the ends thereof which contains said pinion, and the combination of the Bourdon tube, the transmission mechanism and the temperature indicator or recorder is housed in a cabinet which when a temperature indicator is used is further provided with a graduated dial; the improvement comprising the steps of providing, for use in the measuring system, a Bourdon tube having a long overall spring movement of at least 22 mm and an effective spring movement of about 11 mm, filling the measuring system with the gas to a pressure, prevailing at ambient temperature, of at least about 5 bar, and compensating for the non-linear indication that occurs as the Bourdon tube is uncoiled by adjusting said angles α and β.

2. In the method according to claim 1, the improvement comprising the step of providing a Bourdon tube having an effective spring movement of about 11 mm with an overall spring movement of about 40–22 mm.

3. In the method according to claim 1 or 2, the improvement comprising the step of providing said transmission mechanism with a factor of magnification of no more than about 1:8.5.

* * * * *